(12) United States Patent
Wang et al.

(10) Patent No.: US 9,087,379 B2
(45) Date of Patent: Jul. 21, 2015

(54) APPARATUS AND METHOD FOR ESTIMATING POSE OF OBJECT

(71) Applicant: Samsung Electronics Co., Ltd., Suwon-si, Gyeonggi-do (KR)

(72) Inventors: Xiying Wang, Beijing (CN); Shuzheng Gao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 13/725,067

(22) Filed: Dec. 21, 2012

(65) Prior Publication Data

US 2013/0182947 A1 Jul. 18, 2013

(30) Foreign Application Priority Data

Dec. 23, 2011 (CN) .......................... 2011 1 0458172
Oct. 31, 2012 (KR) ........................ 10-2012-0122003

(51) Int. Cl.
*G06T 7/00* (2006.01)
*G06T 7/20* (2006.01)

(52) U.S. Cl.
CPC .............. *G06T 7/0042* (2013.01); *G06T 7/2046* (2013.01); *G06T 2207/10016* (2013.01); *G06T 2207/20064* (2013.01); *G06T 2207/20072* (2013.01); *G06T 2207/20076* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| 6,144,755 | A | 11/2000 | Niyogi et al. |
| 6,959,109 | B2 | 10/2005 | Moustafa |
| 7,756,294 | B2 | 7/2010 | Toyama |
| 2005/0058337 | A1* | 3/2005 | Fujimura et al. .............. 382/159 |
| 2007/0041644 | A1 | 2/2007 | Kim et al. |

(Continued)

FOREIGN PATENT DOCUMENTS

| JP | 2012-512478 | 5/1931 |
| JP | 2007-241478 | 9/2007 |

(Continued)

OTHER PUBLICATIONS

Liu et al. "Vision-Based 3D Articulated Pose Tracking Using Particle Filtering and Model Constraints." Third International IEEE Conference on Signal-Image Technologies and Internet-Based System, Dec. 2007, pp. 959-964.*

(Continued)

*Primary Examiner* — Jon Chang
(74) *Attorney, Agent, or Firm* — NSIP Law (57) ABSTRACT

An apparatus and method for estimating a pose of an object are provided. The apparatus includes an object input unit configured to input an object in an object tracking unit and an object identifying unit, an object tracking unit configured to obtain a tracked pose probability density of the object based on a tracking scheme, an object identifying unit configured to obtain an identified pose probability density of the object based on a training model, and a combination unit configured to obtain an estimated pose probability density of the object using a combination of the tracked pose probability density and the identified pose probability density and to estimate a pose of the object based on the estimated pose probability density of the object. Through the combination, a cumulative error occurring in the object tracking may be corrected, resulting in more accurate object estimation.

17 Claims, 5 Drawing Sheets

(56) References Cited

U.S. PATENT DOCUMENTS

| | | | |
|---|---|---|---|
| 2007/0268295 | A1 | 11/2007 | Okada |
| 2008/0119961 | A1* | 5/2008 | Myeong et al. ............... 700/262 |
| 2008/0152218 | A1* | 6/2008 | Okada ........................... 382/159 |
| 2010/0166317 | A1 | 7/2010 | Li et al. |
| 2011/0052013 | A1* | 3/2011 | Sasahara et al. .............. 382/118 |

FOREIGN PATENT DOCUMENTS

| | | |
|---|---|---|
| JP | 2007-310707 | 11/2007 |
| JP | 4728432 | 4/2011 |
| KR | 2007-0020916 | 2/2007 |
| KR | 10-2008-0068959 | 7/2008 |
| KR | 10-2008-0095680 | 10/2008 |
| KR | 2011-100666 | 9/2011 |
| KR | 10-1169533 | 7/2012 |

OTHER PUBLICATIONS

Gupta et al. "Context and Observation Driven Latent Variable Model for Human Pose Estimation." IEEE Conference on Computer Vision and Pattern Recognition, Jun. 2008, pp. 1-8.*

Ba et al. "A Probabilistic Framework for Joint Head Tracking and Pose Estimation." Proceedings of the 17th International Conference on Pattern Recognition, vol. 4, Aug. 2004, pp. 264-267.*

* cited by examiner

PREVIOUS FRAME
CURRENT FRAME

RANDOM FORESET

APPARATUS AND METHOD FOR ESTIMATING POSE OF OBJECT

CROSS-REFERENCE TO RELATED APPLICATIONS

This application is related to, and claims the priority to, Chinese Patent Application No. 201110458172, filed on Dec. 23, 2011, in the Chinese Patent Office and Korean Patent Application No. 10-2012-0122003, filed on Oct. 31, 2012, in the Korean Intellectual Property Office, the disclosures of which are incorporated herein by reference.

BACKGROUND

1. Field

Embodiments relate to a technology for estimating a pose of an object, and more particularly, to an apparatus and method for estimating a continuous pose of an object.

2. Description of the Related Art

Object pose estimation is of significant importance in computer vision, human-machine interaction, and other fields. In a case of a head of a user being an object to be estimated, individualized information desired by the user may be identified through estimation of a continuous pose of the head. For example, a content of a speech and emotion of a speaker may be obtained from a pose of a head of the speaker. The estimated pose of the object may be used to facilitate human-machine interaction. For example, an increase in effectiveness Of human-machine interaction may be achieved based on a point of gaze obtained by estimating a pose of a head.

Conventionally, an estimating a pose of an object may include a tracking-based method and a training-based method. The tracking-based method estimates a pose of an object through pair matching of a current frame and a previous frame in a video sequence. The tracking-based method has an advantage of relatively accurate estimation of a pose over a short time, but a tracking drift caused by accumulated errors may occur, and when an error in feature matching occurs due to a wide range of rotation or a high velocity of an object, object tracking may fail. Accordingly, a key frame may be used to eliminate or reduce the tracking drift. However, reasonable selection and updating of a key frame may be difficult.

The training-based method may be defined to be object pose estimation through classification or regression. The training-based method estimates a pose of an object based on a training model obtained by training a sample including a label. The training-based method has a disadvantage of failing to obtain an accurate estimate because classification involves rough pose estimation and regression may be susceptible to a real environment.

While accurate object pose estimation is desired, obtaining a pose of an object continuously and stably using a computer vision method has been difficult. In particular, when a rotation range or a velocity of an object increases due to an abrupt change in illumination, object pose estimation has not been effective.

SUMMARY

The foregoing and/or other aspects are achieved by providing an apparatus and method for estimating a pose of an object effectively.

The an exemplary embodiment may provide an apparatus for estimating a pose of an object including an object input unit configured to input an object in an object tracking unit and an object identifying unit, an object tracking unit configured to obtain a tracked pose probability density of the object based on a tracking scheme, an object identifying unit configured to obtain an identified pose probability density of the object based on a training model, and a combination unit configured to obtain an estimated pose probability density of the object using a combination of the tracked pose probability density and the identified pose probability density and to estimate a pose of the object based on the estimated pose probability density of the object.

The apparatus may include an online updating unit configured to update the training model of the object identifying unit based on the pose of the object estimated by the combination unit.

The object identifying unit may be configured to conduct a Gabor wavelet transform on an image including the input object, to obtain an intensity distribution of the object in the Gabor wavelet transformed image, and to obtain the identified pose probability density of the object through the training model, based on the obtained intensity distribution as a feature of the object.

The training model may correspond to a random forest model, and the online updating unit may be configured to verify whether the pose of the object corresponds to an online key sample to update the random forest model, to set a leaf node corresponding to the online key sample in the random forest model when the pose of the object corresponds to the online key sample, and to update the entire random forest model.

The object identifying unit may be configured to calculate a relative pose of the object in two adjacent frames, and to guide the spread of the tracked pose probability density using the relative pose.

The object may include a human head.

The object identifying unit may be configured to execute a pose from orthography and scaling with iterations (POSIT) algorithm based on a matched feature point of the human head to calculate the relative pose of the head in the two adjacent frames, and to process an interior matched feature point using orthogonal iteration after executing the POSIT algorithm.

The combination unit may be configured to obtain the estimated pose probability density of the object by combining a probability density of each identified pose in the identified pose probability density with the tracked pose probability density.

The combination unit may be configured to perform random spreading of each estimated pose in the obtained estimated pose probability density, and to estimate the pose of the object based on the random-spread, estimated pose probability density.

The combination unit may be configured to re-obtain a probability value of each estimated pose in the estimated pose probability density when the pose of the object is estimated based on the random-spread, estimated pose probability density, and the combination unit may be configured to calculate a maximum likelihood (ML) of each estimated pose and to regard the calculated ML as the probability value.

The combination unit may be configured to regard an estimated pose corresponding to the re-obtained ML as the estimated pose of the object.

The an exemplary embodiment may also include a method of estimating a pose of an object, including inputting an object to be estimated, obtaining a tracked pose probability density of the object based on a tracking scheme, obtaining an identified pose probability density of the object based on a training model, and obtaining an estimated pose probability density of the object using a combination of the tracked pose probability density and the identified pose probability density, and estimating a pose of the object based on the estimated pose probability density of the object.

The method may include updating the training model based on the estimated pose of the object.

The obtaining of the tracked pose probability density of the object based on the tracking scheme may include calculating a relative pose of the object in two adjacent frames, and guiding the spread of the tracked pose probability density using the relative pose.

The obtaining of the estimated pose probability density of the object based on the tracking scheme may be performed parallel to the obtaining of the identified pose probability density of the object based on the training model.

Additional aspects of embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout.

Figure 1:
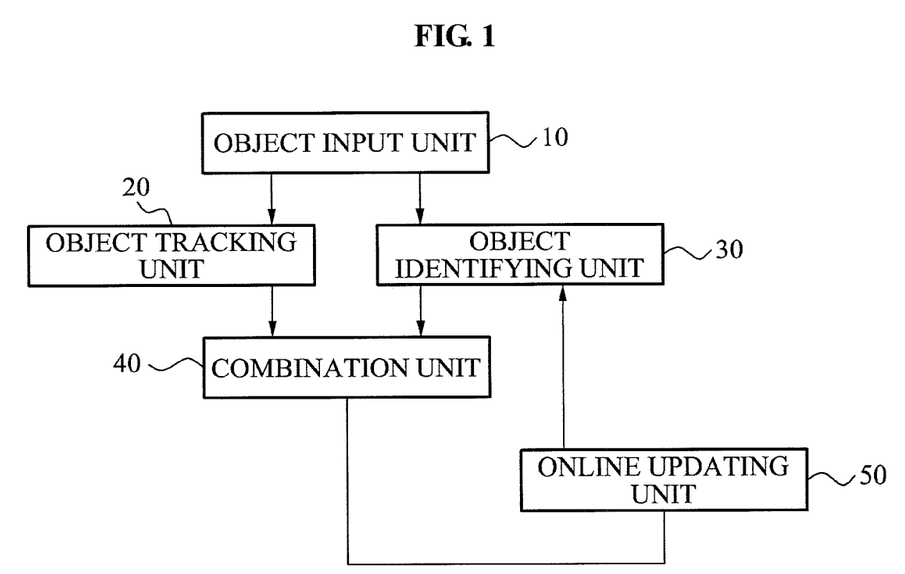
FIG. 1 illustrates an apparatus for estimating a pose of an object according to an exemplary embodiment.

FIG. 1 illustrates an apparatus for estimating a pose of an object according to an exemplary embodiment. The apparatus for estimating a pose of an object includes an object input unit 10, an object tracking unit 20, an object identifying unit 30, and a combination unit 40.

The object input unit 10 may be configured to input an object in the object tracking unit 20 and the object identifying unit 30. A pose of the object may include, but is not limited to, human body parts, for example, a head, a torso, legs, and the like. The object may include any non-human object, for example, a moving object.

The object tracking unit 20 may be configured to obtain a tracked pose probability density of the object based on a tracking scheme.

The object identifying unit 30 may be configured to obtain an identified pose probability density of the object based on a training model.

The combination unit 40 may be configured to obtain an estimated pose probability density of the object using a combination of the tracked pose probability density and the identified pose probability density. The combination unit 40 may be configured to estimate the pose of the object based on the estimated pose probability density of the object.

Accordingly, the apparatus for estimating a pose of an object may avoid a tracking drift issue caused by accumulation of errors in dynamic object tracking, using a combination of two probability densities, a dynamic pose tracking result and a static pose identification result.

An apparatus for estimating a pose of an object may include an online updating unit 50. The online updating unit 50 may be configured to update the training model of the object identifying unit 30 based on the pose of the object estimated by the combination unit 40. Through this online updating, a number of samples of the training model may increase substantially. An increase in a number of samples may contribute to real environment reflection, resulting in improvement in normalization of the training model. Most of the samples need not be stored. Accordingly, the online updating may not have a large memory demand.

An estimating of a pose of an object is not limited to an exemplary embodiment illustrated in FIG. 1. For example, the object input unit 10 or the combination unit 40 may be incorporated in the object tracking unit 20 or the object identifying unit 30, and the online updating unit 50 may be incorporated in the object identifying unit 30. Various combinations of these units may be possible, and implemented, for example, through a controller. Various changes and modifications can be made to the structure of the exemplary apparatus for estimating a pose of an object.

Figure 2:
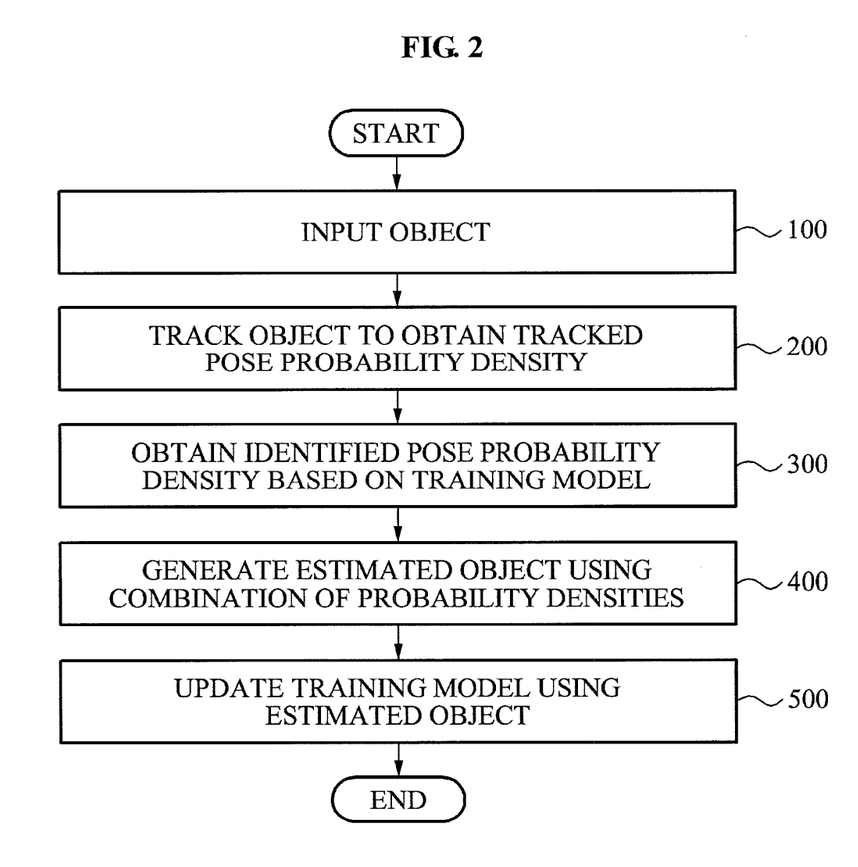
FIG. 2 illustrates a method of estimating a pose of an object according to an exemplary embodiment.

FIG. 2 illustrates a method of estimating a pose of an object according to an exemplary embodiment. The exemplary method may be performed by the apparatus for estimating a pose of an object shown in FIG. 1.

Referring to FIG. 2, in operation 100, the object input unit 10 may input the object in the object tracking unit 20 and the object identifying unit 30. A data format for the object is not limited to a specific format, and may include various data formats available for tracking and identifying the object, for example, a grayscale image, a red/green/blue (RGB) color image, an infrared image, a depth image, and the like. By way of example, when a head is the object to be estimated, the object input unit 10 may separate the head from an original image through processing, for example, active appearance model (AAM) fitting and face location estimation, and may input the head in the object tracking unit 20 and the object identifying unit 30.

In operation 200, the object tracking unit 20 may obtain a tracked pose probability density of the object based on a tracking scheme. When the object is considered to be a rigid body, the object tracking unit 20 may obtain the tracked pose probability density by maximizing a posterior probability in each state of the object to optimize the tracking process. Continuous object tracking may be implemented using various tracking schemes, for example, a particle filter. Examples of the tracking schemes may include various tracking schemes used to obtain a tracked pose probability distribution for a continuously inputted object.

To obtain a more accurate tracked pose probability density, the object tracking unit 20 may calculate a relative pose in two adjacent frame images matched to one another, and may guide the spread of the tracked pose probability density using the relative pose.

A detailed description of the operation by the object tracking unit 20 is disclosed, in which a head is used as an example of the object. In two adjacent frame images matched to one another successfully, an estimated head pose probability density of a previous frame image may be represented as a particle set Pyaw (N) and Ppitch (N). Pyaw (N) may be defined as a probability distribution for yaw angles of N head pose samples, and Ppitch (N) may be defined as a probability distribution for pitch angles of N head pose samples. Since a first frame image fails to include the previous frame image, an arbitrary particle set Pyaw (N) and Ppitch (N) having the same probability value or other suitable head pose probability density may be selected, and the tracking process may be performed based on the selected particle set.

The object tracking unit 20 may extract two-dimensional (2D) feature points of a face in the two adjacent frame images, may match the corresponding feature points, may obtain three-dimensional (3D) coordinates of the feature points in a 3D face model using 3D pose estimation, for example, a pose from orthography and scaling with iteration (POSIT) algorithm, and may reconstruct a relative pose $\delta_t(R,T)$ in the two adjacent frame images where "t" denotes a current time, "R" denotes a rotation matrix of the relative pose, and "T" denotes a translation vector of the relative pose. Interior matched feature points may be processed using an orthogonal iteration (OI) method to ensure convergence after the POSIT-based pose estimation is executed.

To calculate the relative pose $\delta_t(R,T)$, at least four pairs of matched feature points may be selected to obtain an effective relative pose for a probability density of the object pose, that is, for reconstruction of the object pose. The object tracking unit 20 may select a minimum set of matched feature points for reconstructing the object pose arbitrarily, and may select a large number of matched feature points enough to calculate the relative pose. A level of confidence may be calculated for each reconstructed object pose based on a projection error from a vertex in the 3D face model to an image plane. A pose with a highest level of confidence may be selected and determined to be the reconstructed relative pose $\delta_t(R,T)$, and all the samples in the particle set Pyaw (N) and Ppitch (N) may be adjusted or updated based on the reconstructed relative pose $\delta_t(R,T)$ to implement the spread of the probability density. The updated particle set Pyaw (N) and Ppitch (N) may correspond to the tracked pose probability distribution of the current frame image obtained using a tracking algorithm, for example, by the object tracking unit 20.

In operation 300, the object identifying unit 30 may obtain an identified pose probability density of the object in the current frame image based on a training model. The object identifying unit 30 may obtain the identified pose probability density by identifying the pose of the object in a static image at random. The obtained identified pose probability density may be used to correct a cumulative error occurring in the object tracking unit 20, along with the tracked pose probability density obtained in operation 200. A method of obtaining the identified pose probability density based on the training model may compensate for missing estimates resulting from tracking failure in a real complex environment, for example, an abrupt illumination change or blocking of the object.

For example, the object identifying unit 30 may obtain the identified pose probability density of the object based on a random forest model. The random forest model may correspond to an estimation tree set obtained in advance through offline training, and may be used to obtain a probability density for each pose based on a feature of an object input to a frame, using a regression algorithm. An identifying of the pose of the object using random forest regression is known by one of ordinary skill in the art.

In advance of extracting the feature of the object, a Gabor wavelet transform may be applied to the original image. Accordingly, enhanced robustness against illumination, drift, and transformation may be provided to the identified result through improvement in a function of extracting a feature in a complex environment.

The object identifying unit 30 may extract an intensity distribution of the Gabor wave transformed object, for example, on an 8×8 grid. In consideration of the intensity distribution as the feature of the object, the identified pose probability density of the object may be obtained through random forest regression, based on the feature of the object. Gabor cores having different sizes may be standardized by normalizing the feature of the object to zero mean and unit variance.

The present invention is not limited to an exemplary order of operations 200 and 300, and operations 200 and 300 may be performed, for example, in parallel.

In operation 400, the combination unit 40 may obtain an estimated pose probability density of the object using a combination of the tracked pose probability density obtained in 200 and the identified pose probability density obtained in operation 300, and may estimate the pose of the object based on the estimated pose probability density of the object.

Figure 3:
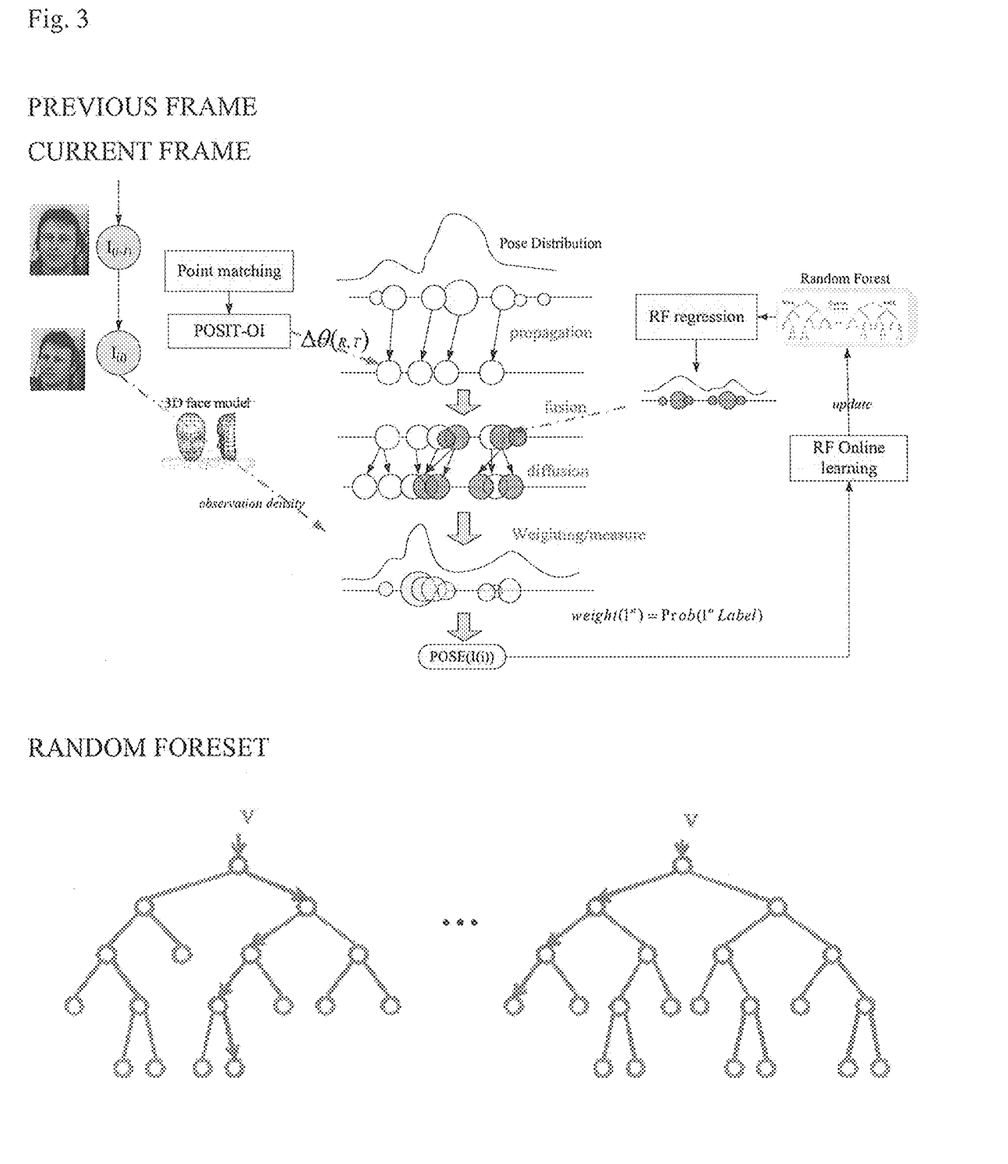
FIG. 3 illustrates object pose estimation using a combination of a tracked pose probability density and an identified pose probability density according to an exemplary embodiment.

FIG. 3 illustrates the object pose estimation using a combination of the tracked pose probability density and the identified pose probability density. In FIG. 3, each circle in (A), (A'), (B), (C), and (C') denotes a pose, and a size of each circle denotes a probability value of the corresponding pose. For example, (A) denotes an estimated pose probability density of the object in the previous frame, and (A') denotes a tracked pose probability density of a current frame obtained by adjusting and updating, that is, spreading, the object pose probability density (A) of the previous frame based on a relative pose $\delta_t(R,T)$ between the previous frame and the current frame. (B) denotes an identified pose probability density of the object in the current frame obtained based on random forest. (C) denotes an estimated pose probability density obtained using a combination of the tracked pose probability density (A') and the identified pose probability density (B). The combination unit 40 may combine a probability density of each identified pose in the identified pose probability density (B) with the tracked pose probability density (A'). The combination unit 40 may determine whether a tracked pose is present in the tracked pose probability density (A') by verifying whether a distance between the tracked pose and the identified pose is less than a predetermined threshold value. The threshold value may be set arbitrarily or may be obtained using one of a plurality of schemes, as needed. When the tracked pose is present, the tracked pose probability value may be increased, for example, to 1/M, where M denotes a number of random trees in random forest. When the tracked pose is absent, the identified pose may be added to the tracked pose probability density as a new tracked pose so that a new tracked pose probability value may become 1/M. After this processing is executed for each identified pose in the identified pose probability density (B), a combined estimated pose probability density may be obtained. The probability value for each pose may be normalized. A low-probability pose may be deleted, and a high-probability pose may be deferred and processed later as needed.

After the probability density combination is completed, the combination unit 40 may carry out random spreading, for example, Brownian motion, for each estimated pose in the obtained estimated pose probability density, to obtain a more effective estimated pose probability density (C').

The combination unit 40 may re-obtain the probability value for each estimated pose in the estimated pose probability density (C'). The combination unit 40 may calculate a maximum likelihood (ML) for each estimated pose, and may regard the calculated ML as the probability value. The combination unit 40 may set a likelihood in proportion to a sum of differences in location between an extracted feature point and a 2D projection for each pose, and may match the 2D projection to 3D coordinates of the feature point. In the pose of the head represented by the particle set Pyaw (N) and Ppitch (N), a probability value of i yaw samples pyaw-i may correspond to an ML estimated for all the pitch samples of Ppitch (N), and a weight value of j pitch samples Ppitch-j may correspond to an ML estimated for all the yaw samples of Pyaw (N).

The combination unit 40 may regard a pose with a highest probability value as the estimated pose of the object.

Although the example embodiment shows the final estimated pose is obtained by calculating the probability value for each pose again through the tracked pose obtained by the combination unit 40, the present invention is not limited to the example embodiment. Various methods of estimating the probability value for each pose through the tracked pose may be applied to the present invention.

In operation 500, the online updating unit 50 may update the training model of the object identifying unit 30 based on the final estimated pose of the object obtained by the combination unit 40 in operation 400. For example, when the random forest model is regarded as the training model, the online updating unit 50 may regard the estimated pose of the object as an out-of-bag sample, and may calculate an out-of-bag error (OOBE) for each tree of the random forest model and an OOBE of the entire random forest model. When the OOBE of the entire random forest model is greater than a critical value, for example, 0.5 or other actual applied values, the online updating unit 50 may regard the pose of the object as an online key sample, may set a leaf node corresponding to the key sample in the random forest model, and may update the entire random forest model.

For example, after an online key sample S of a current tree Tt in the random forest model is determined, the online updating unit 50 may verify whether an OOBE value after subscription of the current tree Tt to the key sample S is greater than the critical value. When the OOBE value is less than the critical value, the online updating unit 50 may execute a leaf node update algorithm.

A detailed description of the leaf node update algorithm is disclosed. For the online sample S, when a node class identical or similar to that of the pose in the sample S is already present in a leaf node, '1' may be added to a number of the node classes. When such a node class is absent, a new node class may be added to a leaf node so that the new node class may include the sample S, and '1' may be added to a total number of classes of the leaf node. Classification of the current leaf node may be determined. For example, determination may be conducted as to whether a total number of classes of the leaf node is greater than a predetermined critical value, and when the total number of classes is greater than the critical value, the node may be split using an existing node splitting technique. When the total number of classes is less than the critical value, the online updating may be ended. The critical value may be set based on a real situation.

Figure 4A:
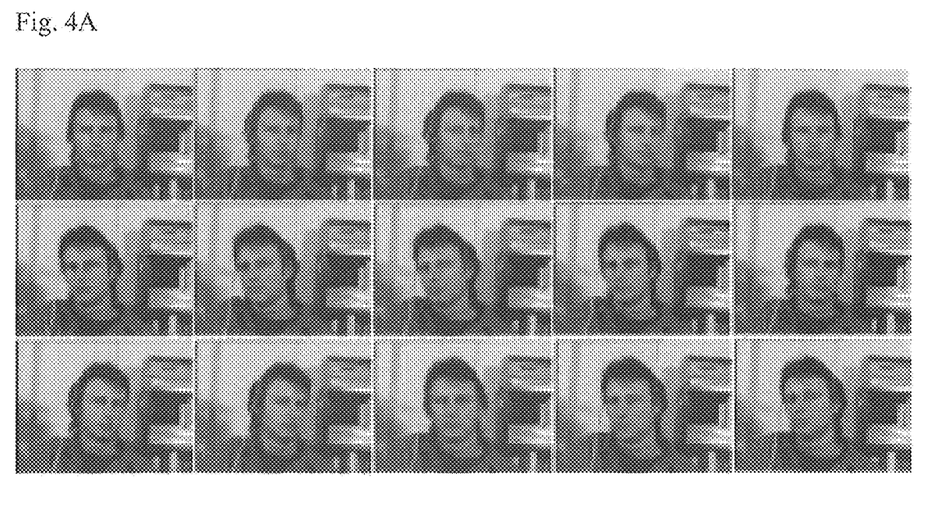
FIGS. 4A and 4B illustrate exemplary rendering of online updating for a training model according to an exemplary embodiment.
Figure 4B:
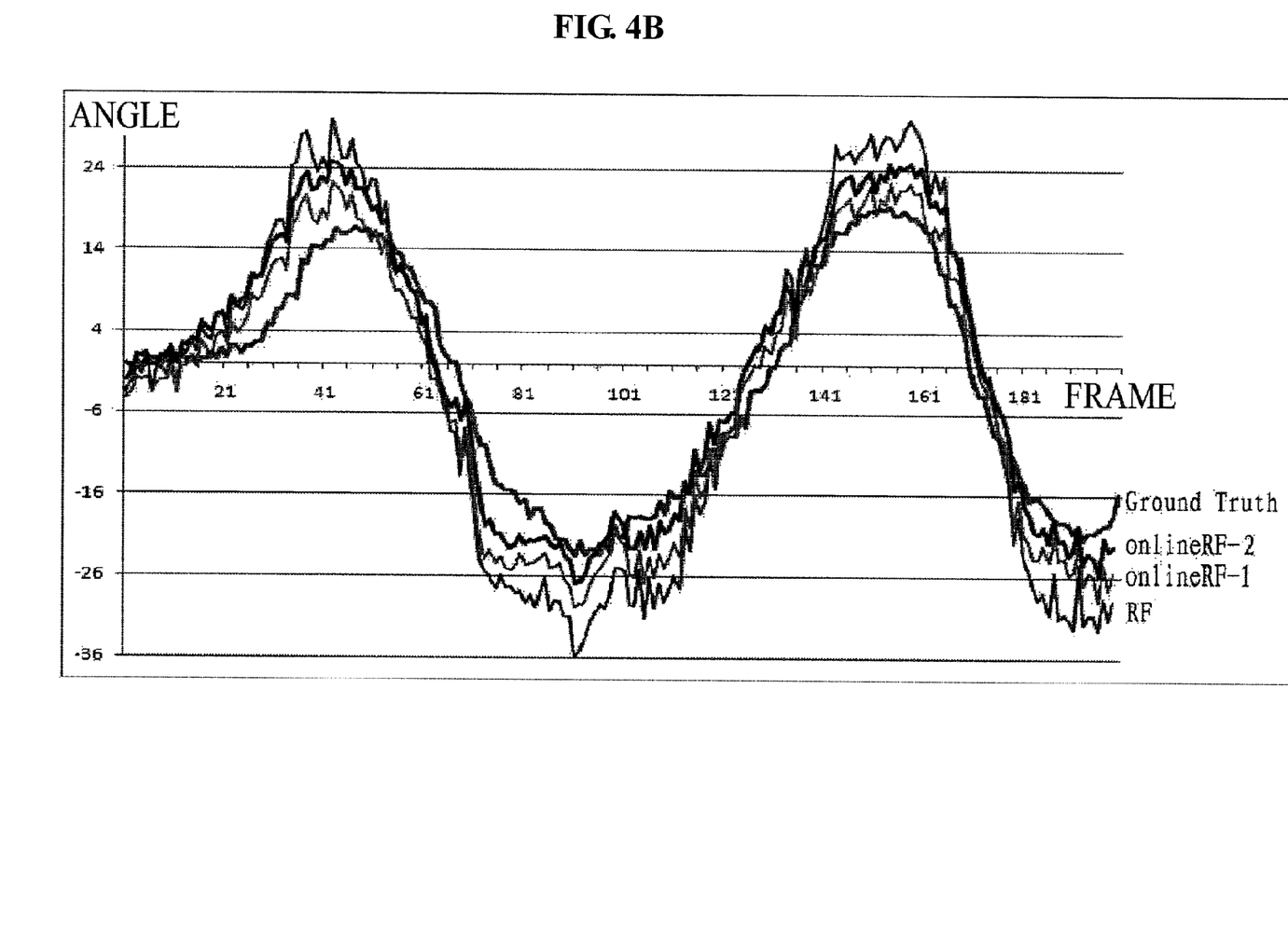

FIGS. 4A and 4B illustrate an exemplary rendering of the online updating based on the training model. In FIG. 4A, illustrated is in an exemplary image sequence jam7. In FIG. 4B, a ground truth denotes a yaw angle of a real head pose in the image sequence, measured using a magnetic sensor, RF denotes an identified result obtained based on an offline random forest, and online RF-1 and online RF-2 denote identified results obtained based on the exemplary online updated random forest. Updating of the training model based on the estimated pose of the object may allow an identified result nearly similar to a real object.

The apparatus for estimating a pose of an object according to the an exemplary embodiment may avoid a tracking drift issue caused by accumulation of errors in dynamic object tracking, using a combination of two probability densities, a dynamic pose tracking result and a static pose identification result. The apparatus for estimating a pose of an object may guide the spread of a tracked pose probability density using a relative pose of adjacent images, to obtain a more accurate tracked pose probability density. The apparatus for estimating a pose of an object may train a training model used to obtain an identified pose probability density in a continuous manner through online updating. Through this online updating, a number of samples of the training model may increase substantially. The increase in number of samples may contribute to real environment reflection, resulting in improvement in normalization of the training model. Most of the samples need not to be stored. The online updating may have a low memory demand.

The apparatus for estimating a pose of an object according to the an exemplary embodiment may be included in a human-machine interaction device. For example, the human-machine interaction device may synthesize windows based on head pose estimated by and eye location extracted by the apparatus for estimating a pose of an object.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for estimating a pose of an object, the apparatus comprising:
    an object input unit configured to input an image of an object in an object tracking unit and an object identifying unit;
    an object tracking unit configured to obtain a tracked pose probability density of the object based on a tracking scheme;
    an object identifying unit configured to obtain an identified pose probability density of the object based on a training model; and
    a combination unit configured to obtain an estimated pose probability density of the object using a combination of the tracked pose probability density and the identified pose probability density and to estimate a pose of the object based on the estimated pose probability density of the object.

2. The apparatus of claim 1, further comprising:
    an online updating unit configured to update the training model of the object identifying unit based on the pose of the object estimated by the combination unit.

3. The apparatus of claim 1, wherein the object identifying unit is configured to conduct a Gabor wavelet transform on an image including the input object, to obtain an intensity distribution of the object in the Gabor wavelet transformed image, and to obtain the identified pose probability density of the object through the training model, based on the obtained intensity distribution as a feature of the object.

4. The apparatus of claim 2, wherein the training model corresponds to a random forest model, and
    the online updating unit is configured to verify whether the pose of the object corresponds to an online key sample to update the random forest model, to set a leaf node corresponding to the online key sample in the random forest model when the pose of the object corresponds to the online key sample, and to update the entire random forest model.

5. The apparatus of claim 1, wherein the object identifying unit is configured to calculate a relative pose of the object in two adjacent frames, and to guide the spread of the tracked pose probability density using the relative pose.

6. The apparatus of claim 5, wherein the object includes a human head.

7. The apparatus of claim 6, wherein the object identifying unit is configured to execute a pose from orthography and scaling with iterations (POSIT) algorithm based on a matched feature point of the human head to calculate the relative pose of the head in the two adjacent frames, and to process an interior matched feature point using orthogonal iteration after executing the POSIT algorithm.

8. The apparatus of claim 1, wherein the combination unit is configured to obtain the estimated pose probability density of the object by combining a probability density of each identified pose in the identified pose probability density with the tracked pose probability density.

9. The apparatus of claim 8, wherein the combination unit is configured to perform random spreading of each estimated pose in the obtained estimated pose probability density, and to estimate the pose of the object based on the random-spread, estimated pose probability density.

10. The apparatus of claim 9, wherein the combination unit is configured to re-obtain a probability value of each estimated pose in the estimated pose probability density when the pose of the object is estimated based on the random-spread, estimated pose probability density, and
the combination unit is configured to calculate a maximum likelihood (ML) of each estimated pose, and to regard the calculated ML as the probability value.

11. The apparatus of claim 10, wherein the combination unit is configured to regard an estimated pose corresponding to the re-obtained ML as the estimated pose of the object.

12. A method of estimating a pose of an object, the method comprising:
inputting an image of an object to be estimated;
obtaining a tracked pose probability density of the object based on a tracking scheme;
obtaining an identified pose probability density of the object based on a training model; and
obtaining an estimated pose probability density of the object using a combination of the tracked pose probability density and the identified pose probability density, and estimating a pose of the object based on the estimated pose probability density of the object.

13. The method of claim 12, further comprising:
updating the training model based on the estimated pose of the object.

14. The method of claim 12, wherein the obtaining of the tracked pose probability density of the object based on the tracking scheme comprises calculating a relative pose of the object in two adjacent frames, and guiding the spread of the tracked pose probability density using the relative pose.

15. The method of claim 14, wherein the obtaining of the estimated pose probability density of the object based on the tracking scheme is performed in parallel to the obtaining of the identified pose probability density of the object based on the training model.

16. A method of obtaining an estimated pose probability density, the method comprising:
inputting an image of an object to be estimated;
obtaining with a processor an estimated pose probability density of the object using a tracked pose probability density and an identified pose probability density; and
estimating a pose of the object based on the estimated pose probability density of the object.

17. The method according to claim 16, wherein the tracked pose probability density, includes calculating a relative pose in two adjacent frame images matched to one another, and
guiding a spread of the tracked pose probability density using the relative pose.

* * * * *